(12) United States Patent
Darbandi et al.

(10) Patent No.: US 11,872,876 B2
(45) Date of Patent: Jan. 16, 2024

(54) ENERGY STORAGE DEVICE FOR A MOTOR VEHICLE, MOTOR VEHICLE, AND PRODUCTION METHOD

(71) Applicant: Bayerische Motoren Werke Aktiengesellschaft, Munich (DE)

(72) Inventors: Azad Darbandi, Unterfoehring (DE); Frank Eckstein, Feldkirchen-Westerham (DE); Juergen Hildinger, Hoehenkirchen-Siegertsbrunn (DE); Julien Marie, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 188 days.

(21) Appl. No.: 17/435,938

(22) PCT Filed: Mar. 5, 2020

(86) PCT No.: PCT/EP2020/055851
§ 371 (c)(1),
(2) Date: Sep. 2, 2021

(87) PCT Pub. No.: WO2020/182612
PCT Pub. Date: Sep. 17, 2020

(65) Prior Publication Data
US 2022/0144062 A1 May 12, 2022

(30) Foreign Application Priority Data
Mar. 13, 2019 (DE) .................. 10 2019 106 424.4

(51) Int. Cl.
*B60K 1/00* (2006.01)
*B60K 1/04* (2019.01)
(Continued)

(52) U.S. Cl.
CPC .............. *B60K 1/04* (2013.01); *H01M 10/613* (2015.04); *H01M 10/625* (2015.04);
(Continued)

(58) Field of Classification Search
CPC .............. B60K 1/04; B60K 2001/0422; H01M 10/613; H01M 10/625; H01M 10/643; H01M 50/213
(Continued)

(56) References Cited

U.S. PATENT DOCUMENTS 8,076,020 B2 * 12/2011 Goto ................... H01M 10/652
429/129
9,033,085 B1 5/2015 Rawlinson
(Continued)

FOREIGN PATENT DOCUMENTS

CN 105990625 A 10/2016
DE 10 2011 001 370 A1 9/2012
(Continued)

OTHER PUBLICATIONS

Rahimzei, E. et al. "Kompendium: Li-Ionen-Batterien", Grundlagen, Bewertungskriterien, Gesetze und Normen, Jul. 2015, pp. 1-66. (URL: https://shop.vde.com/de/kompendium-li-ionen-batterien).
(Continued)

*Primary Examiner* — Hau V Phan
(74) *Attorney, Agent, or Firm* — Crowell & Moring LLP

(57) ABSTRACT

An energy storage device for a motor vehicle includes a plurality of round cells for electrochemically storing energy, and a storage housing in which the plurality of round cells is provided. In the installed position, the round cells run substantially parallel to the vehicle transverse axis. The round cells are arranged within the storage housing in
(Continued)

multiple layers in the direction of the vehicle vertical axis, wherein the number of layers varies in the direction of the vehicle longitudinal axis.

16 Claims, 5 Drawing Sheets

(51) Int. Cl.
  *H01M 10/613* (2014.01)
  *H01M 10/625* (2014.01)
  *H01M 10/643* (2014.01)
  *H01M 50/213* (2021.01)

(52) U.S. Cl.
  CPC ....... *H01M 10/643* (2015.04); *H01M 50/213* (2021.01); *B60K 2001/0422* (2013.01); *B60K 2001/0433* (2013.01); *H01M 2220/20* (2013.01)

(58) Field of Classification Search
  USPC ....................................................... 180/68.5
  See application file for complete search history.

(56) References Cited

U.S. PATENT DOCUMENTS

| | | | | |
|---|---|---|---|---|
| 9,490,460 | B2* | 11/2016 | Yanagi | H01M 10/625 |
| 10,468,644 | B2* | 11/2019 | Niedzwiecki | H01M 50/209 |
| 2002/0007552 | A1 | 1/2002 | Singleton et al. | |
| 2004/0069620 | A1 | 4/2004 | Bitsche et al. | |
| 2004/0226765 | A1* | 11/2004 | Mathews | B60K 1/04 |
| | | | | 180/68.5 |
| 2006/0068278 | A1* | 3/2006 | Bloom | H01B 3/10 |
| | | | | 429/120 |
| 2008/0311468 | A1 | 12/2008 | Hermann et al. | |
| 2013/0017422 | A1* | 1/2013 | Bae | H01M 50/209 |
| | | | | 429/82 |
| 2015/0217707 | A1* | 8/2015 | Tanigaki | B60L 50/66 |
| | | | | 180/65.1 |
| 2015/0236315 | A1 | 8/2015 | Hofer et al. | |
| 2016/0156074 | A1* | 6/2016 | Mascianica | H01M 10/6556 |
| | | | | 429/50 |
| 2016/0285142 | A1 | 9/2016 | Kimura | |
| 2017/0288286 | A1* | 10/2017 | Buckhout | H01M 50/519 |
| 2018/0170165 | A1 | 6/2018 | Nakayama et al. | |
| 2018/0345778 | A1* | 12/2018 | Yamanaka | B62D 21/02 |
| 2019/0006645 | A1* | 1/2019 | Kim | B60K 1/04 |
| 2019/0009667 | A1* | 1/2019 | Steffen | B60K 11/04 |
| 2019/0165335 | A1 | 5/2019 | Kreidler et al. | |

FOREIGN PATENT DOCUMENTS

| | | |
|---|---|---|
| DE | 10 2014 002 165 B3 | 1/2015 |
| DE | 10 2016 206 463 A1 | 10/2017 |
| DE | 10 2017 204 724 A1 | 9/2018 |
| EP | 3 073 546 A1 | 9/2016 |
| KR | 10-2007-0117334 A | 12/2007 |
| WO | WO 2018/019653 A1 | 2/2018 |

OTHER PUBLICATIONS

International Search Report (PCT/ISA/210) issued in PCT Application No. PCT/EP2020/055851 dated Jul. 7, 2020 with English translation (six (6) pages).

German-language Written Opinion (PCT/ISA/237) issued in PCT Application No. PCT/EP2020/055851 dated Jul. 7, 2020 (eight (8) pages).

German-language Search Report issued in German Application No. 10 2019 106 424.4 dated Jan. 29, 2020 with partial English translation (12 pages).

Chinese-language Office Action issued in Chinese Application No. 202080017771.5 dated Nov. 2, 2022 with English translation (17 pages).

\* cited by examiner

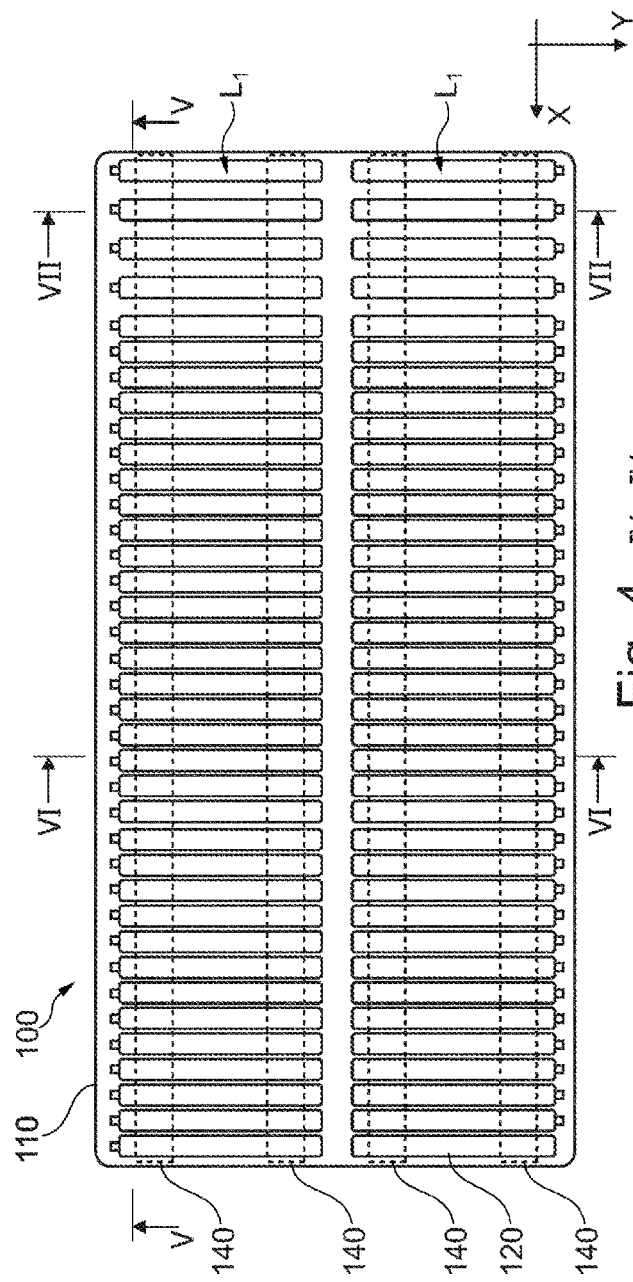
Fig. 4 IV-IV
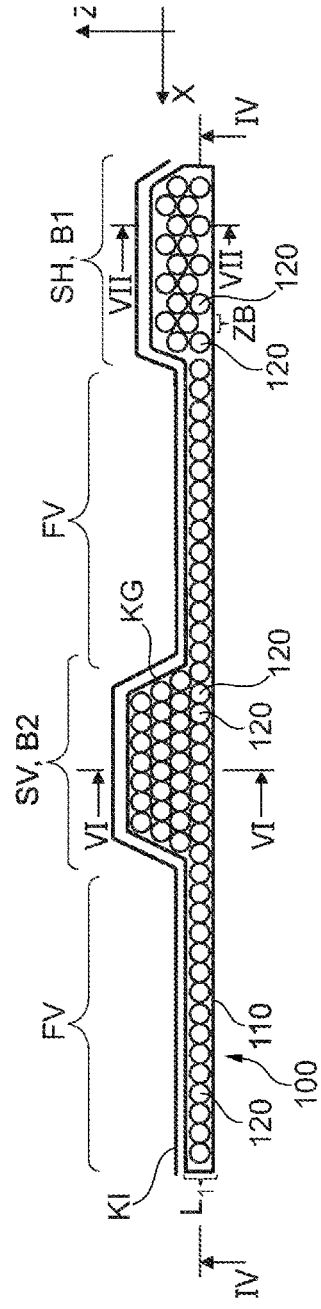
Fig. 5 V-V

ENERGY STORAGE DEVICE FOR A MOTOR VEHICLE, MOTOR VEHICLE, AND PRODUCTION METHOD

BACKGROUND AND SUMMARY OF THE INVENTION

The technology disclosed here relates to an energy storage device for a motor vehicle and to a motor vehicle having such an energy storage device. Such an energy storage device is used, for example, in battery-operated motor vehicles. For example, high-voltage stores, which have a plurality of round cells, prismatic cells or pouch cells, are known from the prior art. Round cells can be manufactured inexpensively. The integration of the round cells into the energy storage device is complex on account of the shape factor and the large number of round cells. The production of prismatic cells or pouch cells is also comparatively complex.

It is a preferred object of the technology disclosed here to reduce or to eliminate at least one disadvantage of a previously known solution or to propose an alternative solution. In particular, it is a preferred object of the technology disclosed here to provide an energy storage device that is improved with respect to at least one of the following factors: production time, production costs, complexity of the production, utilization of installation space, sustainability and/or component reliability. Further preferred objects can be derived from the advantageous effects of the technology disclosed here. The object(s) is/are achieved by the claimed invention.

The electrical energy storage device is a device for storing electrical energy, in particular in order to drive at least one electric (traction) drive machine. The energy storage device comprises at least one electrochemical storage cell for storing electrical energy. For example, the energy storage device can be a high-voltage store or a high-voltage battery.

The energy storage device comprises at least one storage housing. The storage housing is expediently an enclosure, which surrounds at least the high-voltage components of the energy storage device. The storage housing is expediently of gas-tight design, such that gases that may leak out of the storage cells are collected. The housing can advantageously be used for fire protection, contact protection, intrusion protection and/or protection against moisture and dust.

The storage housing can be produced at least partly from a metal, in particular from aluminum, an aluminum alloy, steel or a steel alloy. At least one or more of the following components can be accommodated in the at least one storage housing of the energy storage device: storage cells, components of the power electronics system, contactor(s) for interrupting the current supply to the motor vehicle, cooling elements, electrical conductors, control device(s). The energy storage device can have, in particular, elements that are to be cooled, in particular storage cells and/or components of the power electronics system of the energy storage device. The components are expediently preassembled before the assembly group is assembled in the motor vehicle.

The electrical energy storage device comprises a plurality of round cells for electrochemically storing energy. A round cell is generally accommodated in a cylindrical cell can. If the active materials of the round cell expand due to operation, the housing is tensioned in the circumferential region. Therefore, comparatively thin housing cross sections can advantageously compensate for the forces resulting from the swelling. The cell can is preferably produced from steel or a steel alloy.

The round cells can each have at least one degassing opening at each of the two ends. The degassing openings are used to allow gases arising to escape from the cell can. However, only one degassing opening per round cell can also be provided. In each case at least one degassing opening per round cell is advantageously arranged in a degassing manner toward the outer sill in the installed position.

The length-to-diameter ratio of the round cells preferably has a value between 5 and 30, preferably between 7 and 15, and particularly preferably of 9 and 11. The length-to-diameter ratio is the quotient from the length of the cell can of the round cell as the numerator and the diameter of the cell can of the round cell as the denominator. In a preferred configuration, the round cells can have an (external) diameter of approximately 45 mm to 55 mm, for example. Furthermore, the round cells can advantageously have a length of 360 mm to 1100 mm, preferably of approximately 450 mm to 600 mm, and particularly preferably of approximately 520 mm to 570 mm.

According to the technology disclosed here, provision can be made for the round cells to be produced from coated semifinished electrode products. The cathode material or the anode material is expediently applied in each case to carrier layers or carrier layer webs of the respective semifinished electrode product. For example, the cathode material can be applied to a cathode carrier layer (for example aluminum) and the anode material can be applied to an anode carrier layer (for example copper) by way of coating.

According to the prior art, the carrier layer webs are coated with cathode material or anode material, wherein several coating regions, in which in each case the cathode material or anode material is applied, are provided in a manner distributed over the total width (for example 1000 mm and more) of the carrier layer web. For common round cells, such a coating region can be approximately 65 mm wide, for example. The carrier layer web is reduced in size after the coating with the anode material or cathode material by way of several separation method steps to the desired format of the round cell (for example 65 mm). For this purpose, the carrier layer web is severed in the longitudinal direction of the carrier layer web in each case in the non-coated regions provided between the coating regions. The impurities (generally metal particles) arising during separation could get into the coatings and the separation method steps are time-consuming. Both are undesired in practice.

According to the technology disclosed here, it can be provided that the round cells comprise at least one coated semifinished electrode product, which does not have a mechanical separating edge perpendicular and/or parallel to the longitudinal axis of the round cells, the separating edge having been produced by a separation method step after the coating of the semifinished electrode products.

According to the technology disclosed here, provision can be made for the round cells to each comprise at least one coated semifinished electrode product with a rectangular cross section, wherein the length of the longer side of the semifinished electrode product substantially corresponds to or exceeds a total width of a carrier layer web, which has been coated with anode material or cathode material in order to form the semifinished electrode product, with the result that, after the coating, the semifinished electrode product is or was able to be wound in the longitudinal direction of the carrier layer web without a further separation method step.

In particular, the technology disclosed here also comprises a method for producing an electrochemical storage cell, in particular a round cell, comprising the step whereby, after at least one carrier layer web forming the semifinished electrode product has been coated with cathode material or anode material, the semifinished electrode product is wound to form a storage cell, without the carrier layer web being subjected to a further separation method step in the longitudinal direction of the carrier layer web after the coating.

In other words, the at least one semifinished electrode product is thus wound in the longitudinal direction of the web after the coating without a further separation method step. The semifinished products that form the cathode, the anode or the separator are preferably wound after the coating without a separation method. The technology disclosed here furthermore comprises a method for producing the energy storage device disclosed here, comprising the steps of:

- producing a plurality of storage cells, in particular round cells, as is described above; and
- arranging the storage cells in the energy storage device disclosed here.

According to the technology disclosed here, in their installed position, the round cells run substantially parallel (that is to say parallel, possibly with deviations that are insignificant for the function) to the vehicle transverse axis Y. The vehicle transverse axis is the axis running perpendicular to the vehicle longitudinal axis X and horizontally in the normal position of the motor vehicle.

The round cells are arranged within the storage housing in multiple layers in the direction of the vehicle vertical axis Z. In this case, the vehicle vertical axis is the axis running perpendicular to the vehicle longitudinal axis X and vertically in the normal position of the motor vehicle. A layer of round cells is in this case a plurality of round cells that are installed in the same plane in the storage housing and have substantially the same spacing from the base of the storage housing. The number of layers advantageously varies in the direction of the vehicle longitudinal axis X. According to the technology disclosed here, the storage housing can have a top side, the external housing contour of which is adapted to the lower internal contour of a passenger cabin of the motor vehicle, wherein, in the installed position, the total height of the multiple layers is varied to adapt to the housing contour in the direction of the vehicle longitudinal axis by virtue of immediately adjacent round cells of a layer in the installed position being spaced further apart from one another in a first region of the layer in the direction of the vehicle longitudinal axis than immediately adjacent round cells in a second region of the same layer, with the result that, in the first region, a further round cell of another layer advantageously penetrates further in a first intermediate region formed by the round cells immediately adjacent in the first region than an identically formed further round cell of the other layer that penetrates in a second intermediate region formed by round cells immediately adjacent in the second region. The total height of the multiple layers is calculated from the base of the storage housing to the upper end of the top layer at the respective location in the storage housing. The internal contour of the passenger cabin is the contour that delimits the interior of the passenger cabin that is accessible to a vehicle user. In particular, the housing contour can be adapted to the internal contour in such a way that an expediently uniform gap, which is preferably less than 15 cm or less than 10 cm or less than 5 cm, is provided between the top side of the storage housing and the internal contour of the passenger cabin.

According to the technology disclosed here, at least one, in the installed position of the energy storage device, bottom layer of the multiple layers can extend in the direction of the vehicle longitudinal axis from a, in the installed position, front foot region of the storage housing, the foot region being adjacent to the front footwell of the motor vehicle, up to a seat region of the storage housing, wherein the seat region is adjacent to the rear bench seat of the motor vehicle.

According to the technology disclosed here, fewer layers can be arranged in at least one of the foot regions of the storage housing that are adjacent to the front or rear footwell of the motor vehicle than in a seat region of the storage housing, wherein the seat region is adjacent to the front seats and/or the rear seats (for example individual seats or rear bench seat) of the motor vehicle. Provision can thus advantageously be made for only one bottom layer of round cells to be provided in the storage housing, for example in the front and/or rear foot region, whereas several layers can be provided in a manner stacked above one another in the front and/or rear seat region. This has the advantage that, in particular, the installation space below the front seats or below the rear seats can be utilized more efficiently in order to therefore improve the electrical storage capacity of the motor vehicle.

Provision can furthermore advantageously be made for at least the round cells of the bottom layer to be arranged in such a way that all ends of the round cells provided on one side of the bottom layer have the same polarity. The round cells of two layers arranged directly above one another are preferably oriented such that all ends of the round cells, provided on a first side, within the two layers each have the same polarity, wherein on the first side the polarity of the ends of a first layer of the two layers is opposite to the polarity of the ends of a second layer of the two layers. Such a configuration advantageously has a low internal resistance.

As an alternative, provision can be made for all electrical terminals of the round cells of all layers to be provided on one side. Such a configuration is particularly space-saving.

The electrical cell terminals of a round cell are particularly preferably embodied to be electrically insulated from the cell can. Therefore, the individual cell cans have a floating potential.

In a preferred configuration, provision can be made for the plurality of round cells of a layer to be connected to one another by an adhesive applied over the plurality of round cells of the same layer. The adhesive can expediently first be applied after the individual round cells of a layer have been positioned with respect to one another, for example after the round cells have been arranged in the storage housing. Therefore, the individual round cells of a layer can advantageously be fixed relative to one another in a cost-effective and space-saving manner. As adhesive, it is possible to use polyurethanes, polyamides or polyethylene, for example.

In a preferred configuration, at least one at least partly undulating position element is provided on the housing base, in which position element a plurality of round cells are accommodated in order to form a layer, in particular the bottom layer. The position element expediently runs perpendicular to the longitudinal axis of the round cells. The position element can furthermore advantageously be of strip-like design.

According to the technology disclosed here, cooling elements for cooling the round cells can be provided between at least two layers, the cooling elements preferably having an at least partly undulating design in cross section perpendicular to the vehicle transverse axis Y. In one configuration, the cooling elements can be connected to a cooling circuit of the motor vehicle.

The disclosed technology furthermore relates to a motor vehicle, that comprises the energy storage device disclosed here.

In other words, the technology disclosed here relates to a new cell format, which advantageously shortens the cell production cycle time by up to a factor of 5 and reduces the energetically inactive parts in the cell structure. The design can reduce the cell costs and be advantageous with respect to the cell integration, as a result of which the available installation space in the store or in the motor vehicle can be better utilized. Furthermore, the store can advantageously be adapted to the topography of the passenger cabin and also effectively fill unfavorable installation spaces with energy units (cells). The round cells can be produced comparatively favorably. Further production steps, in particular the cutting of the semifinished products, can also be saved compared to previously known round cells with other shapes. This additionally reduces the probability of malfunctions due to impurities that could get into the storage cells during the production of the storage cells. The round cells disclosed here manage with a comparatively light cell can, which can be produced with comparatively low material usage. By using a steel housing, it is advantageously possible to dispense with aluminum in the production of the cell can, which can have a positive effect with respect to production costs and sustainability. The cell can be produced using comparatively short weld seams. In comparison to other cell formats, the round cells disclosed here are less susceptible to swelling caused by operation and any manufacturing tolerances carry less weight, which can simplify the module integration. The technology disclosed here is furthermore based, inter alia, on the basic idea of a cylindrical cell format with a ratio of height/length to diameter of 6 to 25. The number of inactive parts can advantageously be reduced. Furthermore, the electrode can advantageously be coated with a higher coating weight and therefore higher energy densities can be achieved. Overall, therefore, the otherwise good energy density of the round cells at the cell level can also be further increased at the energy storage level by way of better space utilization. In particular, long current collectors can essentially be avoided, with the result that the line losses are lower.

The technology disclosed here is now explained based on the figures.

BRIEF DESCRIPTION OF THE DRAWINGS

FIG. 4 shows a schematic cross-sectional view along the line IV-IV according to FIG. 5.

FIG. 5 shows a schematic cross-sectional view along the line V-V of FIG. 4.

DETAILED DESCRIPTION OF THE DRAWINGS

Figure 1:
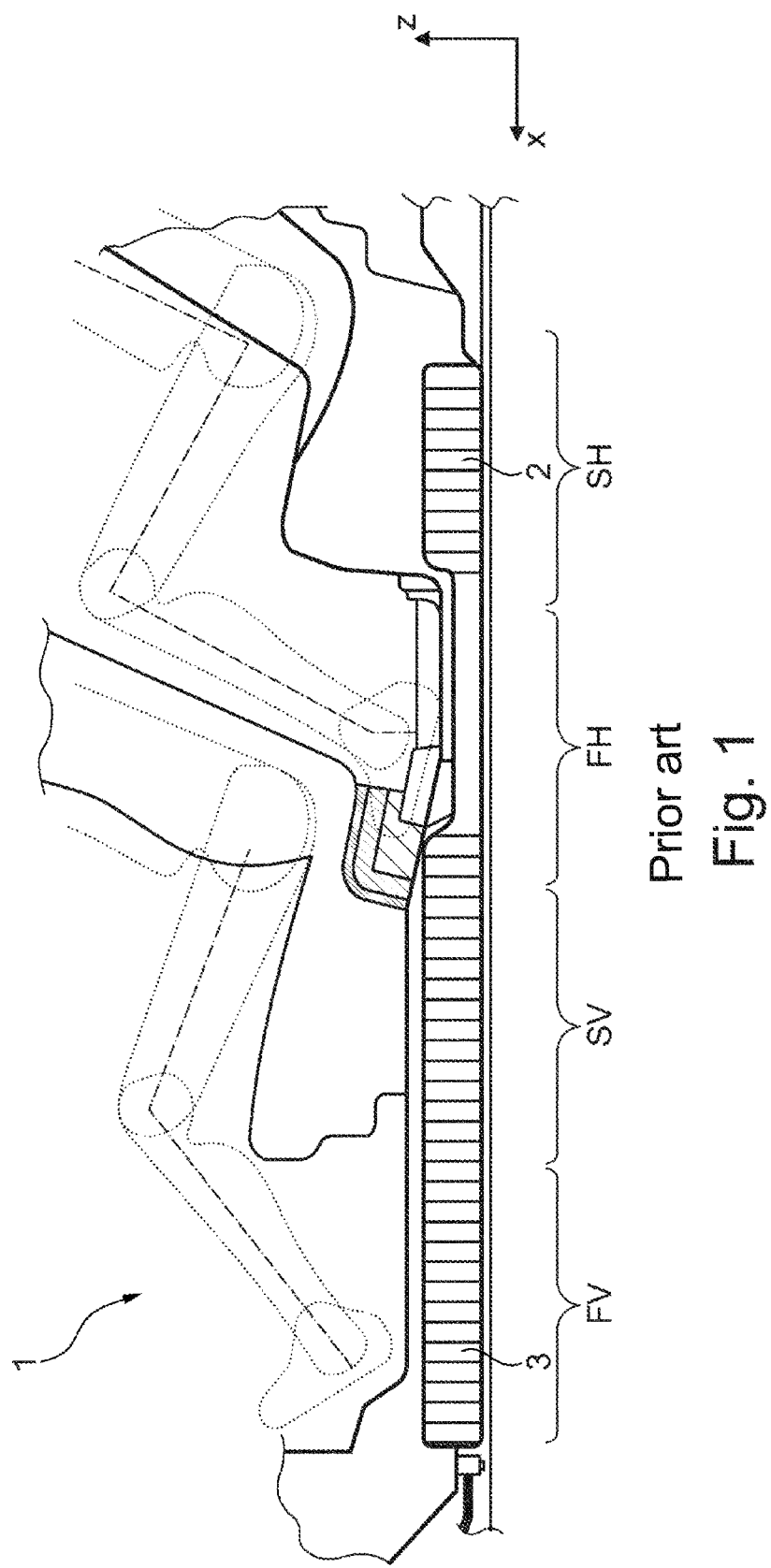
FIG. 1 shows a schematic section of a longitudinal section through a motor vehicle according to the prior art.

FIG. 1 shows a schematic section of a longitudinal section through a motor vehicle according to the prior art. The high-voltage battery 1 shown here comprises a plurality of prismatic cells 3. The cells 3 are arranged upright. No cells can be arranged in the rear foot region here since there is not enough installation height available for the cells. Furthermore, two layers of cells cannot be arranged above one another underneath the front seats or underneath the rear seats either. The contour of the housing 3 of the high-voltage battery 1 conforms to the design of the prismatic cells 3.

Figure 2:
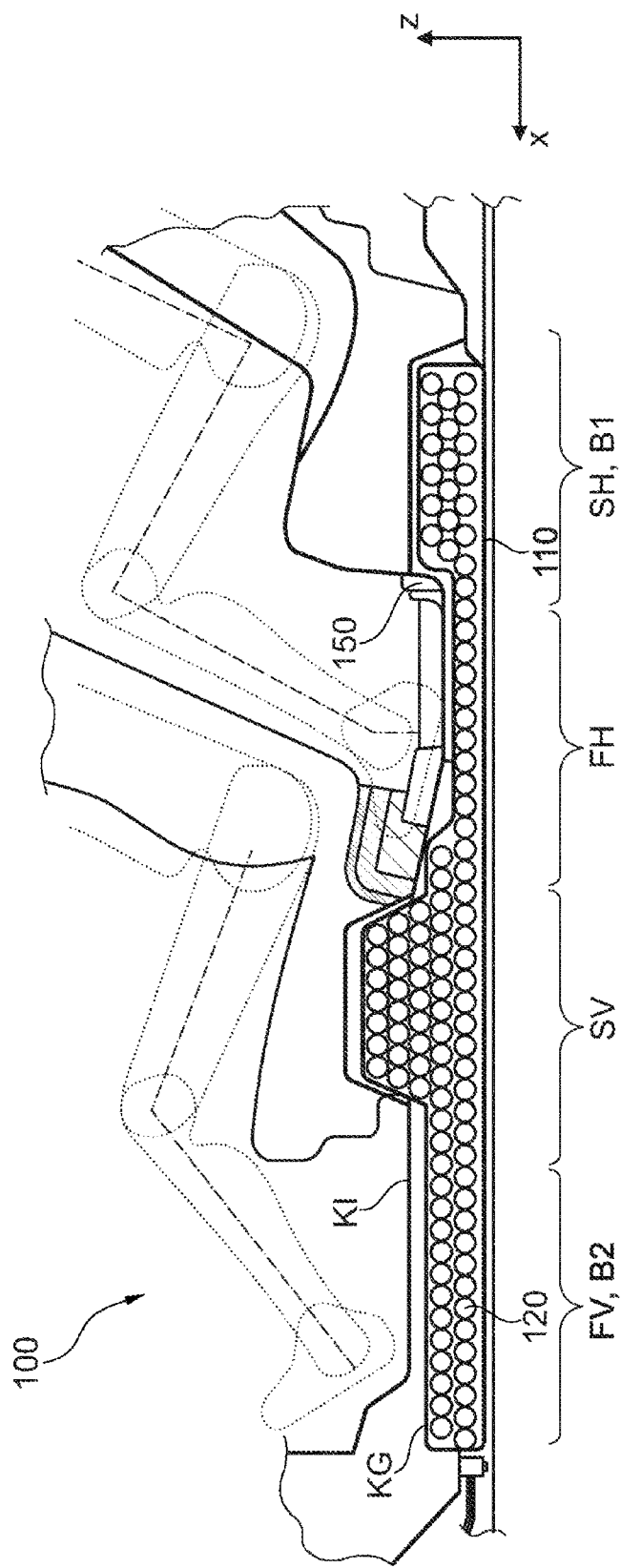
FIG. 2 shows a schematic section of a longitudinal section through a motor vehicle according to the technology disclosed here.

FIG. 2 shows a schematic section of a longitudinal section through a motor vehicle according to the technology disclosed here. The storage cells of the energy storage device 100 are configured here as round cells 120, which are accommodated in the storage housing 110 in a manner organized in layers. The round cells 120 are arranged here substantially parallel to the vehicle transverse axis Y. The bottom layer of round cells extends here counter to the direction of the vehicle longitudinal axis X from the front foot region FV of the storage housing 110 up to the rear seat region SH of the storage housing 100. The rear seat region SH is arranged here underneath the rear bench seat. The number of layers varies in the direction of the vehicle longitudinal axis X in order to therefore utilize the installation space in optimum fashion. The height of the individual round cells 120 or the layers in the direction of the vehicle vertical axis Z results here from the maximum external diameter of the round cells 120. Since the maximum external diameter of the round cells 120 is comparatively low in comparison to previously known prismatic cells, the installation space present here in the direction of the vehicle vertical axis Z can be much better utilized. Furthermore, the housing contour KG is advantageously adapted here to the internal contour KI of the passenger cabin 150 (cf. also FIG. 5). For the purpose of better utilization of installation space, the immediately adjacent round cells 120 are in this case spaced further apart from another in the rear seat region SH or first region B1 in a direction parallel to the vehicle longitudinal axis X than the immediately adjacent round cells 120 in the front seat region SV or second region B2. Owing to this measure, in the first region B1 the round cells 120 of the immediately adjacent second layer can penetrate deeper into the intermediate regions of the first or bottom layer, as a result of which in this first region a total of three layers can be integrated. Without this measure, only two layers would be able to be arranged in this installation space.

Figure 3:
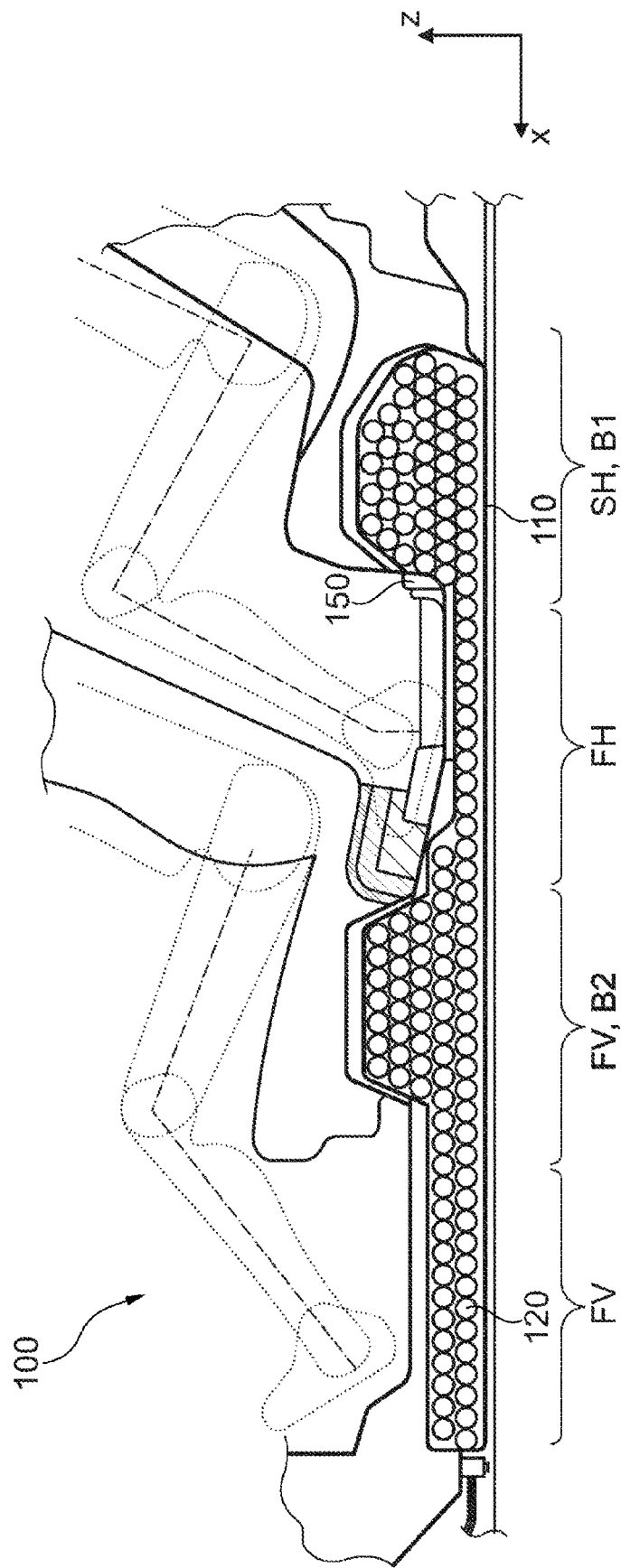
FIG. 3 shows a schematic section of a longitudinal section through a motor vehicle according to a further exemplary embodiment of the technology disclosed here.

FIG. 3 shows a schematic section of a longitudinal section through a motor vehicle according to a further exemplary embodiment of the technology disclosed here. In the following description of the alternative exemplary embodiment illustrated in FIG. 3, identical reference signs are used for features that are identical and/or at least comparable in terms of their configuration and/or mode of operation in comparison to the first exemplary embodiment illustrated in FIG. 2. If they are not explained again in detail, the configuration and/or mode of operation thereof corresponds to the configuration and/or mode of operation of the features already described above. The configuration according to FIG. 3 differs from the previous configuration in that the internal contour KI and the housing contour KG of the energy storage device 100 in the region of the rear bench seat has been changed. Overall, the energy storage device 100 has more installation space here in the rear seat region in the direction of the vehicle vertical axis Z. Consequently, in comparison to the configuration according to FIG. 2, there are further layers here, of which the top three layers have round cells 120 spaced further apart in the direction of the vehicle longitudinal axis X for the purpose of better adaptation to the overall height.

FIG. 5 shows a schematic cross-sectional view along the line V-V of FIG. 4. The figure shows the energy storage device 100 of FIG. 2 and the internal contour KI of the motor vehicle. The remaining components of the motor vehicle have been omitted for simplification. The first intermediate region ZB, which is formed by immediately adjacent round cells 120 of the bottom layer L1, is shown in FIG. 5.

FIG. 4 shows a schematic cross-sectional view along the line IV-IV according to FIG. 5. The plurality of round cells 120 is arranged parallel to the vehicle transverse axis Y. The round cells 120 have a length-to-diameter ratio of approximately 10. The cooling elements 140 are arranged here perpendicularly to the round cells 120 and parallel to the vehicle longitudinal direction X. The cooling elements 140 are of strip-like design. The width of the cooling elements 140 is a multiple smaller than the length of the round cells 120. The cooling elements 140 can be of an essentially undulating design in a cross section perpendicular to the vehicle transverse axis Y. The cooling elements 140 have been omitted in the other views and cross sections for simplification. The adhesive, which can be applied here between the two cooling elements 140, has not been illustrated here and in the other figures. The adhesive is expediently constituted to connect the round cells 120 of a layer L1, L2, L3, L4 to one another. Likewise not shown here are the undulating position elements, which, in one configuration, position the bottom layer on the base of the housing relative to one another. In the configuration shown here, the electrical terminals of the round cells 120 are provided on the outer edge of the bottom layer L1. The round cells 120 preferably each have the degassing opening (not shown here) only toward the outer edge or toward the outer longitudinal support of the motor vehicle. In the embodiment illustrated here, in each case two bottom layers L1 are arranged behind one another in the direction of the vehicle transverse axis Y. The two bottom layers L1 are provided parallel to one another. It is likewise conceivable that only one bottom layer L1 or three bottom layers L1 are provided in the storage housing. It is likewise conceivable that, instead of two round cell stacks, only one round cell stack with correspondingly longer round cells 120 or three round cell stacks with correspondingly shorter round cells 120 is provided.

Figure 6:
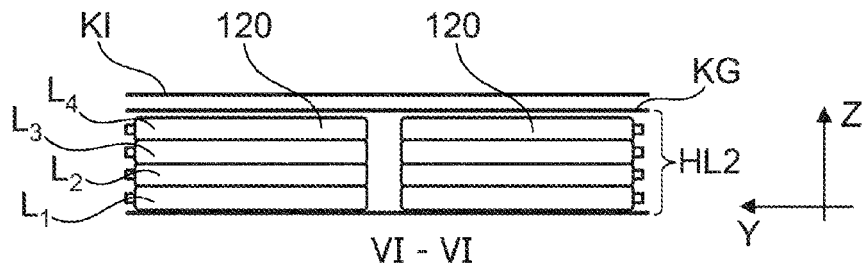
FIG. 6 shows a schematic cross-sectional view along the line VI-VI of FIG. 4.

FIG. 6 shows a schematic cross-sectional view along the line VI-VI of FIG. 4. Two round cell stacks are arranged in the storage housing 110. In this cross-sectional view, each stack comprises multiple layers L1, L2, L3, L4, which add up to form a total height HL2. The total height HL2 essentially corresponds here to the height of the interior of the storage housing 110, which is delimited here by the base and by the housing contour KG of the top side of the storage housing 110. The layers L1 and L3, whose full diameter can be seen here, are arranged in the foreground here. The layers L2 and L4 are shown here in the background and penetrate into the intermediate regions (cf. FIG. 5).

Figure 7:
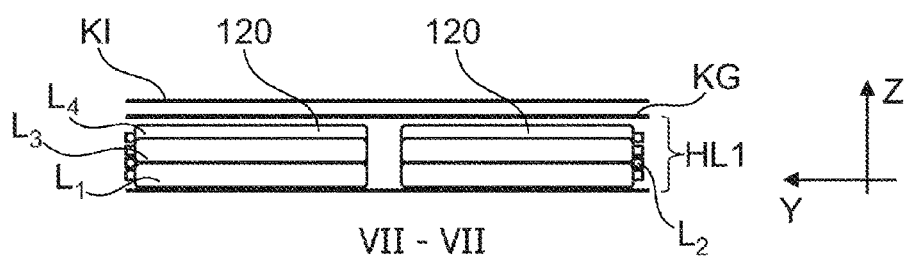
FIG. 7 shows a schematic cross-sectional view along the line VII-VII of FIG. 4.

FIG. 7 shows a schematic cross-sectional view along the line VII-VII of FIG. 4. The layers L1 and L3 are again provided in the foreground and the layers L2 and L4 are arranged in the background. Unlike in the cross section of FIG. 6, in this case the layers L1 and L3 are immersed much deeper into the intermediate regions ZB such that the resulting overall height HL1 is significantly lower than the overall height HL2 of FIG. 6. Even if the number of round cells 120 per layer is reduced due to the enlarged intermediate region, this technology permits the integration of multiple layers given a low overall height, with the result that overall the electrical storage capacity increases.

Figure 8:
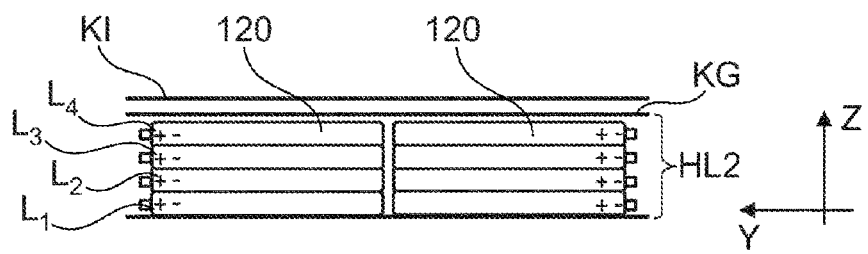
FIG. 8 shows a schematic cross-sectional view of a further configuration.

FIG. 8 shows the arrangement of the poles of the round cells in the configuration according to FIG. 5. As already mentioned, the two electrical cell terminals of the round cells 120 are each provided on the external ends. The external ends are the ends that are provided proximally to the outer longitudinal supports of the vehicle body. In each case a degassing opening is also advantageously provided at these ends. Such a configuration can be of a particularly compact design, since the gap between the two round cell stacks can be smaller.

Figure 9:
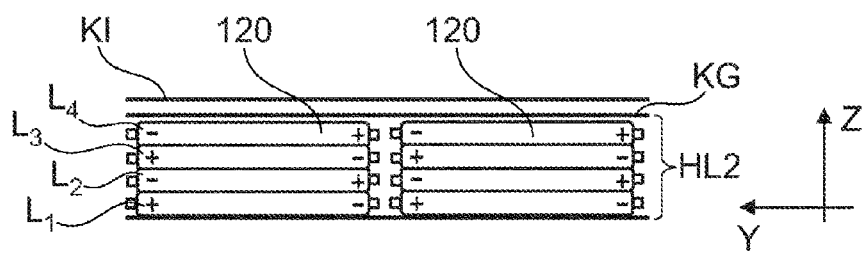
FIG. 9 shows a schematic cross-sectional view of a further configuration.

FIG. 9 shows a schematic cross-sectional view of a further configuration. In a manner deviating from the configuration according to FIG. 8, the electrical cell terminals here are provided on both sides of the round cells 120. Such a configuration can advantageously have lower line losses. The round cells 120 of a layer, for example all round cells 120 of the bottom layer L1, have the same polarity (symbolized here by a + sign) on one side of the layer, for example the outer side. On the other side of the same layer, in this case the inner side, all round cells 120 of the same layer have the same polarity, which is opposite to the first side. In the immediately adjacent layer, for example the layer L2, the ends of one side in turn each have electrical terminals of the same polarity. This differs, however, from the polarity of the immediately adjacent layer, for example the bottom layer L1. A layer structure configured in this way with round cells 120 oriented in this way makes it possible to interconnect the round cells 120 in a particularly low-expenditure and energy-efficient manner.

The preceding description of the present invention is used only for illustrative purposes and not for the purpose of restricting the invention. Within the scope of the invention, various changes and modifications are possible without departing from the scope of the invention and the equivalents thereof. Even if the energy storage device is shown here with round cells, the technology disclosed here can equally be applied to other cell geometries that expediently have the cross section-to-length ratios disclosed here.

What is claimed is:

1. An energy storage device for a motor vehicle, the energy storage device comprising:
   a plurality of round cells for electrochemically storing energy; and
   a storage housing, in which the plurality of round cells is provided, wherein:
     in an installed position, the round cells run substantially parallel to a vehicle transverse axis;
     the round cells are arranged within the storage housing in multiple layers in a direction of a vehicle vertical axis;
     a number of the layers varies in a direction of a vehicle longitudinal axis,
     the storage housing has a top side,
     a housing contour of the top side is adapted to a lower internal contour of a passenger cabin of the motor vehicle, and
     a total height of the multiple layers is varied to adapt to the housing contour by virtue of immediately adjacent round cells of a first layer of the multiple layers being spaced further apart from one another in a first region of the layer in the direction of the vehicle longitudinal axis than immediately adjacent round cells in a second region of the first layer.

2. The energy storage device according to claim 1, wherein a length-to-diameter ratio of the round cells has a value between 5 and 30.

3. The energy storage device according to claim 2, wherein the value is between 7 and 15.

4. The energy storage device according to claim 3, wherein the value is between 9 and 11.

5. The energy storage device according to claim 1, wherein each of the round cells comprises at least one coated semifinished electrode product, which does not have a mechanical separating edge perpendicular to a longitudinal axis of the round cells, the separating edge having been produced by a separation method after coating of the semifinished electrode products.

6. The energy storage device according to claim 1, wherein each of the round cells comprises at least one coated semifinished electrode product with a rectangular cross section, wherein a length of a longer side of the semifinished electrode product substantially corresponds to a total width of a carrier layer web, which has been coated with anode material or cathode material in order to form the semifinished electrode product.

7. The energy storage device according to claim 1, wherein at least one bottom layer of the multiple layers extends from a front foot region of the storage housing, the foot region being adjacent to a front footwell, up to a rear seat region of the storage housing, wherein the rear seat region is adjacent to the rear seat.

8. The energy storage device according to claim 1, wherein fewer layers are arranged in at least one of foot regions of the storage housing that are adjacent to a front foot well or a rear foot well than in a seat region of the storage housing that is adjacent to at least one of front seats or rear seats.

9. The energy storage device according to claim 1, wherein at least the round cells of a bottom layer of the multiple layers are oriented such that all ends of the round cells provided on one side of the bottom layer have a same polarity.

10. The energy storage device according to claim 1, wherein a plurality of the round cells of a layer of the multiple layers are connected to one another by an adhesive applied over the plurality of the round cells.

11. The energy storage device according to claim 1, wherein at least one at least partly undulating position element is provided on a housing base, and a plurality of the round cells are accommodated in the position element in order to form a layer of the multiple layers.

12. The energy storage device according to claim 1, wherein cooling elements for cooling the round cells are provided between at least two layers of the multiple layers.

13. The energy storage device according to claim 12, wherein the cooling elements have an at least partly undulating design.

14. The energy storage device according to claim 1, wherein each of the round cells has at least one degassing opening at each of two ends.

15. A motor vehicle comprising the energy storage device according to claim 1.

16. An energy storage device for a motor vehicle, the energy storage device comprising:
    a plurality of round cells for electrochemically storing energy; and
    a storage housing, in which the plurality of round cells is provided, wherein:
        in an installed position, the round cells run substantially parallel to a vehicle transverse axis;
        the round cells are arranged within the storage housing in multiple layers in a direction of a vehicle vertical axis;
        a number of the layers varies in a direction of a vehicle longitudinal axis; and
        fewer layers are arranged in a foot region of the storage housing that is adjacent to a front foot well than in a seat region of the storage housing that is adjacent to at least one of front seats or rear seats.

* * * * *